US011009199B2

United States Patent
Gallo, Jr.

(10) Patent No.: US 11,009,199 B2
(45) Date of Patent: May 18, 2021

(54) SOLAR-POWERED FLAG LIGHT

(71) Applicant: Joseph Gallo, Jr., Hillsborough, NJ (US)

(72) Inventor: Joseph Gallo, Jr., Hillsborough, NJ (US)

( * ) Notice: Subject to any disclaimer, the term of this patent is extended or adjusted under 35 U.S.C. 154(b) by 0 days.

(21) Appl. No.: 16/597,907

(22) Filed: Oct. 10, 2019

(65) Prior Publication Data

US 2020/0116319 A1    Apr. 16, 2020

Related U.S. Application Data

(60) Provisional application No. 62/745,001, filed on Oct. 12, 2018.

(51) Int. Cl.
| | | |
|---|---|---|
| *F21S 9/03* | (2006.01) | |
| *F21S 4/28* | (2016.01) | |
| *F21S 10/02* | (2006.01) | |
| *F21W 131/10* | (2006.01) | |
| *G09F 17/00* | (2006.01) | |

(52) U.S. Cl.
CPC .......... *F21S 9/032* (2013.01); *F21S 4/28* (2016.01); *F21S 10/023* (2013.01); *F21W 2131/10* (2013.01); *G09F 17/00* (2013.01)

(58) Field of Classification Search
CPC ............ F21S 9/032; F21S 4/28; F21S 10/023; F21W 2131/10; G09F 17/00
USPC ....................................................... 362/183
See application file for complete search history.

(56) References Cited

U.S. PATENT DOCUMENTS

| | | | |
|---|---|---|---|
| 7,699,508 B2 | 4/2010 | Schroeder | |
| 8,746,928 B2 | 6/2014 | Morris et al. | |
| 9,316,365 B1 | 4/2016 | Ko | |
| 9,396,673 B2 | 7/2016 | Bort | |
| 9,677,728 B2 | 6/2017 | Toner | |
| 9,713,368 B1* | 7/2017 | Kuelbs | A45B 3/00 |
| 2002/0114155 A1* | 8/2002 | Katogi | F21S 4/28 |
| | | | 362/219 |
| 2005/0072057 A1 | 4/2005 | Ciaccia | |
| 2012/0113625 A1* | 5/2012 | Werner | F21L 4/08 |
| | | | 362/183 |
| 2015/0062859 A1* | 3/2015 | Kimberley | F21S 9/03 |
| | | | 362/1 |
| 2016/0284254 A1* | 9/2016 | Scaturro | G09F 17/00 |
| 2017/0146198 A1* | 5/2017 | Nielsen-Williams | |
| | | | F21V 3/049 |

(Continued)

*Primary Examiner* — Andrew J Coughlin
*Assistant Examiner* — Jessica M Apenteng
(74) *Attorney, Agent, or Firm* — Boudwin Intellectual Property; Daniel Boudwin

(57) ABSTRACT

A solar-powered flag light designed to affix to a flagpole or flag stand and thereby illuminate the flag for easy viewing. The solar-powered flag light includes an elongated housing having an exterior surface and an interior surface. The elongated housing has an arcuate shape. A channel is on the interior surface along a central axis designed to receive a pole therein. A plurality of lights is along the interior surface and a plurality of solar cells are disposed along the exterior surface. At least one power source is within the housing and operably connected to the plurality of lights and the plurality of solar cells, such that the solar cells power the lights. In this way, a user is able to illuminate a flag, such that individuals may easily view the flag.

19 Claims, 5 Drawing Sheets

(56) References Cited

U.S. PATENT DOCUMENTS

2019/0063696 A1\* 2/2019 Grandadam ........... H05B 45/00
2019/0141821 A1\* 5/2019 Hong .................... H05B 47/19

\* cited by examiner

_US 11,009,199 B2_

SOLAR-POWERED FLAG LIGHT

CROSS REFERENCE TO RELATED APPLICATIONS

This application claims the benefit of U.S. Provisional Application No. 62/745,001 filed on Oct. 12, 2018. The above identified patent application is herein incorporated by reference in its entirety to provide continuity of disclosure.

BACKGROUND OF THE INVENTION

The present invention relates to lighted flags. More specifically, the invention provides an elongated housing having a channel along a central axis configured to fit overtop a flag pole or a flag stand with one or more clamps to secure and a plurality of lights on an interior surface and a plurality of solar cells configured to power the lights disposed on an exterior surface.

Many people enjoy hanging flags outside their home, garage, shed or other structure, on a straight or angled flagpole extending from their porch or on a garden pole to denote a specific country, state or sports team, or to display an ornamental, seasonal or holiday design. Additionally, a flag stand, such as a garden-style flag stand may be utilized to display the flag apart from a structure. However, when it gets dark or if the weather is overcast or foggy, it becomes difficult to view the details of the flag. Although a user could position a spotlight or floodlight at a base of the pole to illuminate the flag, this casts a shadow of a portion of the flag, thereby making it difficult to view both the front and the rear of the flag.

Furthermore, when traditional flag lights are utilized to provide light to a flag pole or flag stand, light is typically directed upward. In addition to being less effective, these methods also contribute to luminous pollution of light in the areas surrounding the flag pole or flag stand. Thus, an improved solar-powered flag light that can efficiently light a flag from both the front and the rear, while utilizing downward facing lights, is desired.

SUMMARY OF THE INVENTION

In view of the foregoing disadvantages inherent in the known types of flag lights now present in the known art, the present invention provides a solar-powered flag light wherein the same can be utilized for providing convenience for the user when desiring to illuminate a flag on a pole, or flag stand, such that individuals may easily view the flag when there is little to no sunlight.

The present system comprises a solar-powered flag light. The solar-powered flag light comprises an elongated housing having an exterior surface and an interior surface. The elongated housing has an arcuate shape such that the interior surface is concave. A channel is disposed on the interior surface along a central axis configured to receive a pole or a rod therein. One or more clamps are disposed along the channel configured to secure the channel to the pole. A plurality of lights is disposed along the interior surface and a plurality of solar cells are disposed along the exterior surface. At least one power source is disposed within the housing and operably connected to the plurality of lights and the plurality of solar cells, such that the solar cells power the lights. In this way, a user s able to illuminate a flag on a pole such that individuals may easily view the flag when there is little to no sunlight.

It is another object of the present invention to provide a solar-powered flag light that attaches to a garden flag stand. In such an embodiment, the channel is dimensioned to rest upon a beam of the garden flag stand. The clamps are additionally dimensioned to receive a garden flag stand.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
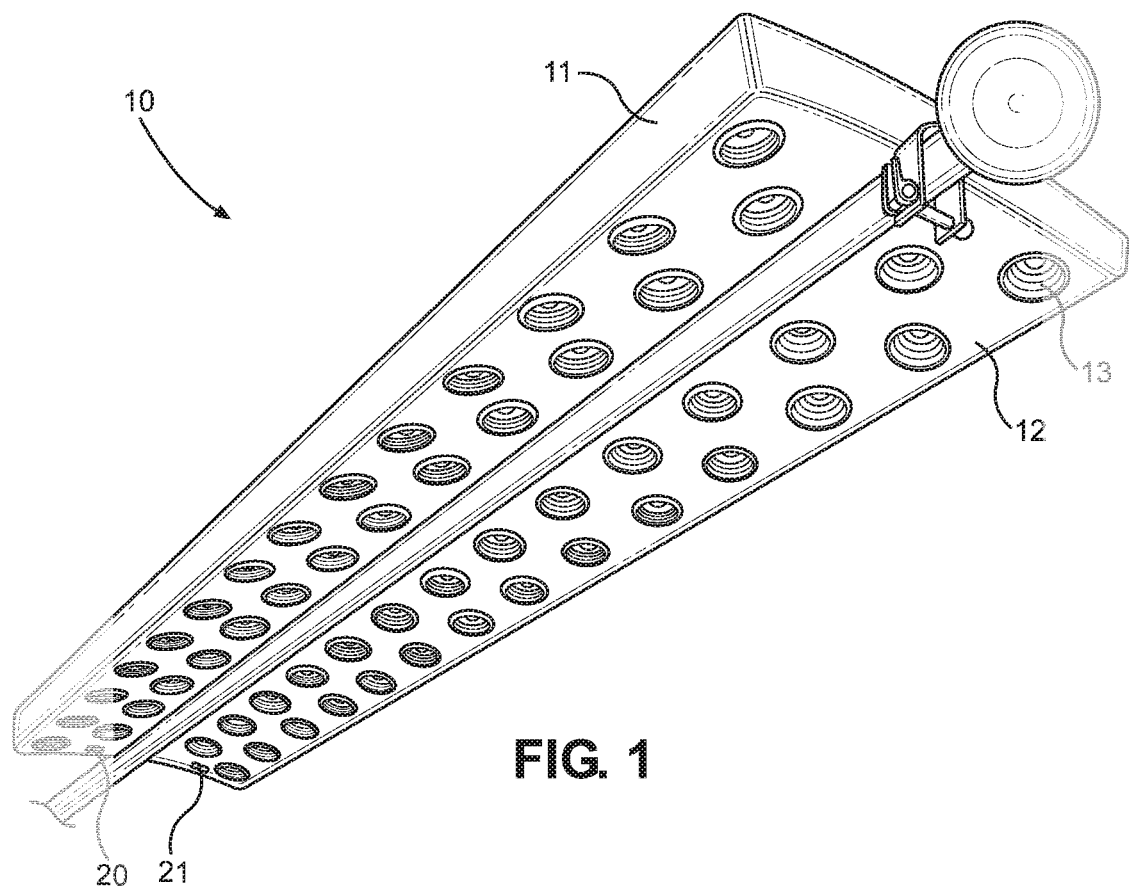
FIG. 1 shows a perspective view of an embodiment of the solar-powered flag light.

Reference is made herein to the attached drawings. Like reference numerals are used throughout the drawings to depict like or similar elements of the solar-powered flag light. The figures are intended for representative purposes only and should not be considered to be limiting in any respect.

Referring now to FIG. 1, there is shown a perspective view of an embodiment of the solar-powered flag light. In the illustrated embodiment, the solar-powered flag light is affixed to a flag pole. A solar-powered flag light 10 comprises an elongated housing 11 having an interior surface 12. The elongated housing 11 has an arcuate shape, such that the interior surface 12 is concave. A plurality of lights 13 is disposed on the interior surface 12. The arcuate shape of the elongated housing 11 ensures that both a front side and a rear side of the pole are equally lit by the plurality of lights 13.

Each light of the plurality of lights 13 is operably connected to a power source disposed within the elongated housing. In one embodiment, the power source is removable, such that the power source can be replaced when burnt out. In another embodiment, the power source comprises a rechargeable battery, such that the user can remove the rechargeable battery when the rechargeable battery no longer recharges. The rechargeable batteries are chargeable while disposed within the elongated housing, such as via a plurality of solar cells. In some embodiments, the power source comprises a power source monitoring system. The power source monitoring system is configured to dim the plurality of lights to a reduced level. For example, the power monitoring system may dim the plurality of lights to a 50% brightness level when the power source is between 30% and 10% capacity and may perform an orderly shutdown of the device when the power source falls below 10% capacity.

In the illustrated embodiment, the plurality of lights 13 are disposed at an offset interval from a first end of the elongated housing 11 to a second end of the elongated housing 11. Thus, the plurality of lights 13 are disposed along the entire length of the elongated housing 11, thereby ensuring an even and uninterrupted flow of light. In the shown embodiment, each light 13 is housed in a domed housing, thereby providing a wider distribution of light. In the shown embodiment, each light 13 comprises an LED light, such that the illumination provided is sufficient regardless of weather. No limitation is made regarding the number of lights of the plurality of lights 13 or the specific orientation of the lights of the plurality of lights 13. For example, the lights may be in a linear alignment or offset from each other. Additionally, the lights of the plurality of lights 13 may be disposed upon a printed circuit board (PCB).

In one embodiment, the solar-powered flag light 10 further comprises at least one switch. In the shown embodiment, a first switch 20 is disposed on the interior surface 12. The first switch 20 is operably connected to the plurality of lights 13, such that when the first switch 20 is actuated, the plurality of lights 13 are also actuated. In the illustrated embodiment, a second switch 21 is additionally disposed on the interior surface 12, wherein the second switch 21 is configured to actuate test/demo light sequence.

Figure 2:
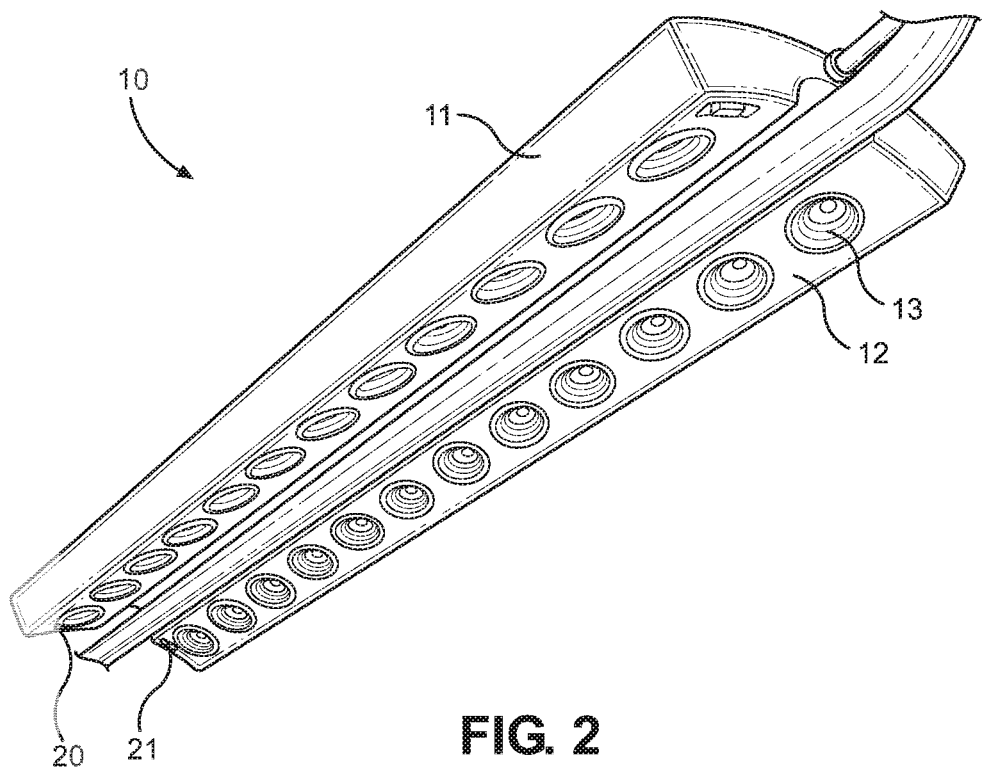
FIG. 2 shows another perspective view of an embodiment of the solar-powered flag light.

Referring now to FIG. 2, there is shown another perspective view of an embodiment of the solar-powered flag light. In the illustrated embodiment, the solar-powered flag light is affixed to a garden flag stand. In another embodiment, the plurality of lights 13 are disposed linearly along the interior surface 12. In the shown embodiment, the plurality of lights 13 are disposed along the entire length of the elongated housing 11, such that the illumination provided by the plurality of lights 13 is consistent throughout. In the shown embodiment, the elongated housing 11 has an arcuate shape with a degree measurement greater than the degree measured by the elongated housing 11 in the embodiment illustrated in FIG. 1. In this way, the arcuate hap of the elongated housing 11 and degree measurement thereof ensure the pole and flag are illuminated regardless of the total number of the plurality of lights 13. Thus, although there are fewer lights in the plurality of lights in the embodiment illustrated in FIG. 2, the greater degree of curvature provided by the arcuate nature of the elongated housing 11 provide an equivalent amount of light to the attached pole. In the shown embodiment, the elongated housing 11 further comprises a universal switch 19, wherein the universal switch 19 is configured to actuate the plurality of lights 13 as well as a sound system operably connected to the solar-powered flag light.

Figure 3:
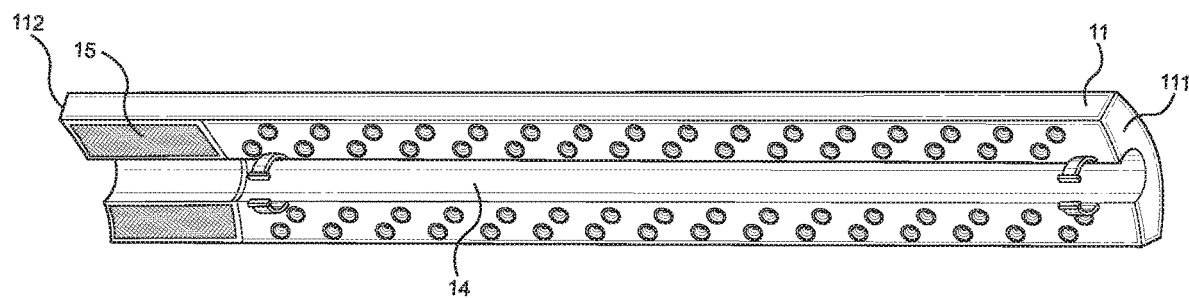
FIG. 3 shows another perspective view of an embodiment of the solar-powered flag light.

Referring now to FIG. 3, there is shown a perspective view of an embodiment of the solar-powered flag light. The elongated housing 11 includes a first end 111 disposed opposite a second end 112. A channel 14 is disposed along a central axis of the elongated housing 11, such that the channel 14 extends from the first end 111 to the second end 112. The channel 14 is configured to receive a pole therein, such that the solar-powered flag light rests flush atop a pole, such as a flagpole. In this way, the channel 14 is arcuately shaped.

In the illustrated embodiment, the elongated housing 11 further comprises at least one speaker 15. In the shown embodiment, a speaker 15 is disposed on either side of the channel 14. In the illustrated embodiment, the speakers 15 are disposed at the second end 112 of the elongated housing 11. In the shown embodiment, the speakers 15 are operably connected to a personal electronic device, such as a mobile phone or computer, via wireless communication, such as through Bluetooth. In a further embodiment, the elongated housing 11 further includes a logic embedded therein, wherein the logic is operably connected to a pairing button, such that the user can sync their personal electronic device to the solar-powered flag light. In this way, the user can remotely activate the speaker 15.

Figure 4:
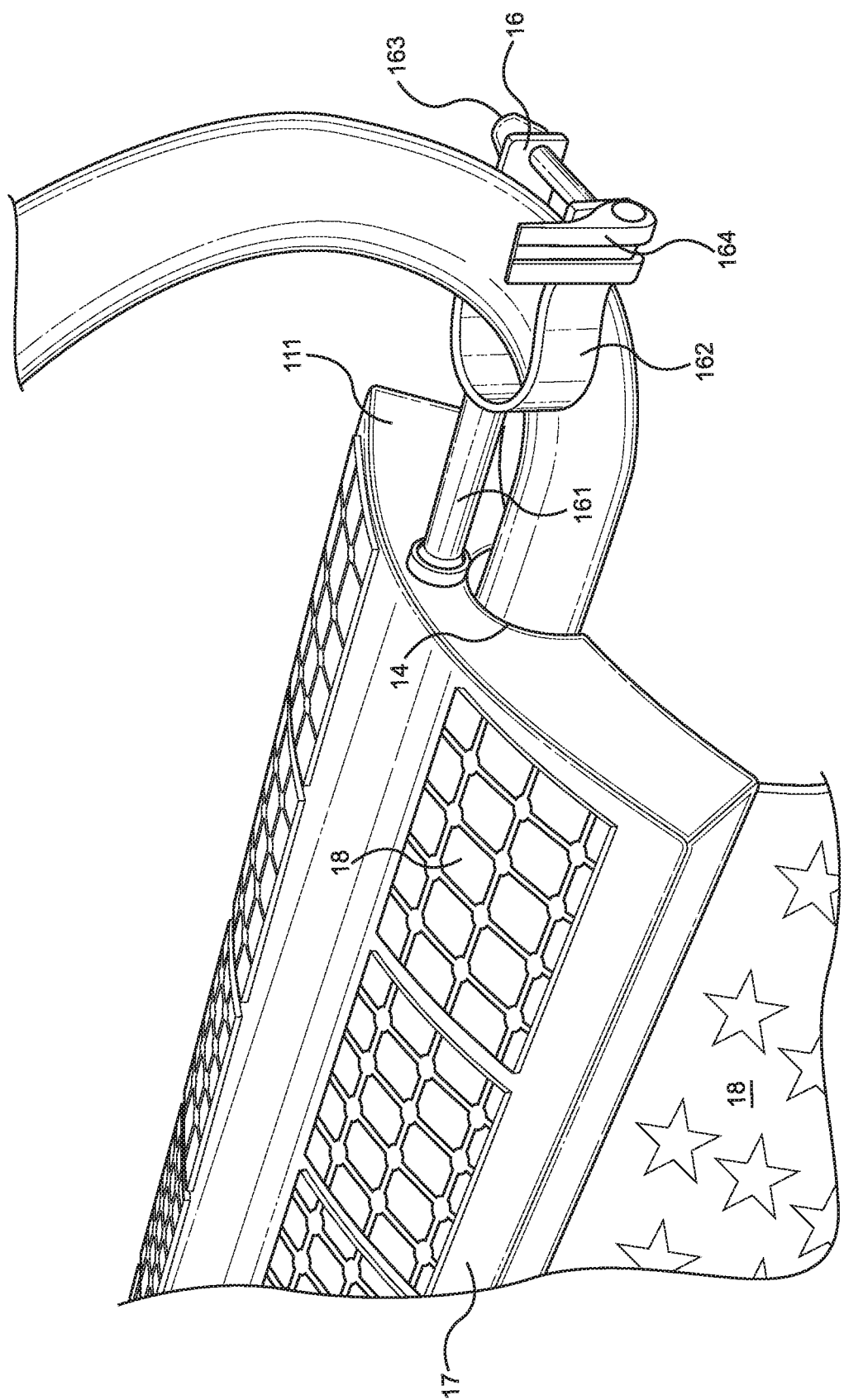
FIG. 4 shows a perspective view of an embodiment of the attachment clamp of the solar-powered flag light.

Referring now to FIG. 4, there is shown a perspective view of an embodiment of the attachment clamp of the solar-powered flag light. The solar-powered flag light further comprises an exterior surface 17 having a plurality of solar cells 18 disposed thereon, such that the solar cells 18 are configured to store sunlight therein. Each solar cell 18 is operably connected to the power source disposed within the elongated housing, such that the solar cells 18 are configured to provide energy to the plurality of lights disposed on the interior surface of the elongated housing. In one embodiment, a removable decal is disposed atop the exterior surface 17, wherein the removable decal is configured to provide a decorative embodiment to the elongated housing without interfering with the power collection of the solar cells 18.

A clamp 16 is disposed on the first end 111 of the elongated housing, wherein the clamp 16 is configured to secure the elongated housing to a pole. In the illustrated embodiment, the clamp 16 is disposed proximate to the channel 14, such that the clamp 16 is disposed at a central point of the elongated housing, thereby providing a secure and balanced fit. In the illustrated embodiment, an additional clamp is disposed proximate to the second end of the elongated housing, to provide additional security when fastening the solar-powered flag light to a pole. In another embodiment, each clamp 16 is disposed on the interior surface of the elongated housing around the channel 14.

The clamp 16 comprises a support member 161 having a proximal end secured to the first end 111 of the elongated housing and a distal end secured to a U-shaped member 162. The U-shaped member 162 is configured to receive the pole therein, such that each arm of the U-shaped member 162 is on opposing sides of the pole. A latch 163 is disposed between each distal end of the arms of the U-shaped member 162, wherein the latch 163 is configured to enclose the clamp 16 around the pole, thereby securing the elongated housing to the pole. In the illustrated embodiment, the latch 163 further comprises a release catch 164 configured to actuate the latch 163. The release catch 164 is configured to allow the user to secure the latch 163 without undue strain, thereby ensuring the clamp 16 can be easily utilized by a plurality of individuals.

Figure 5:
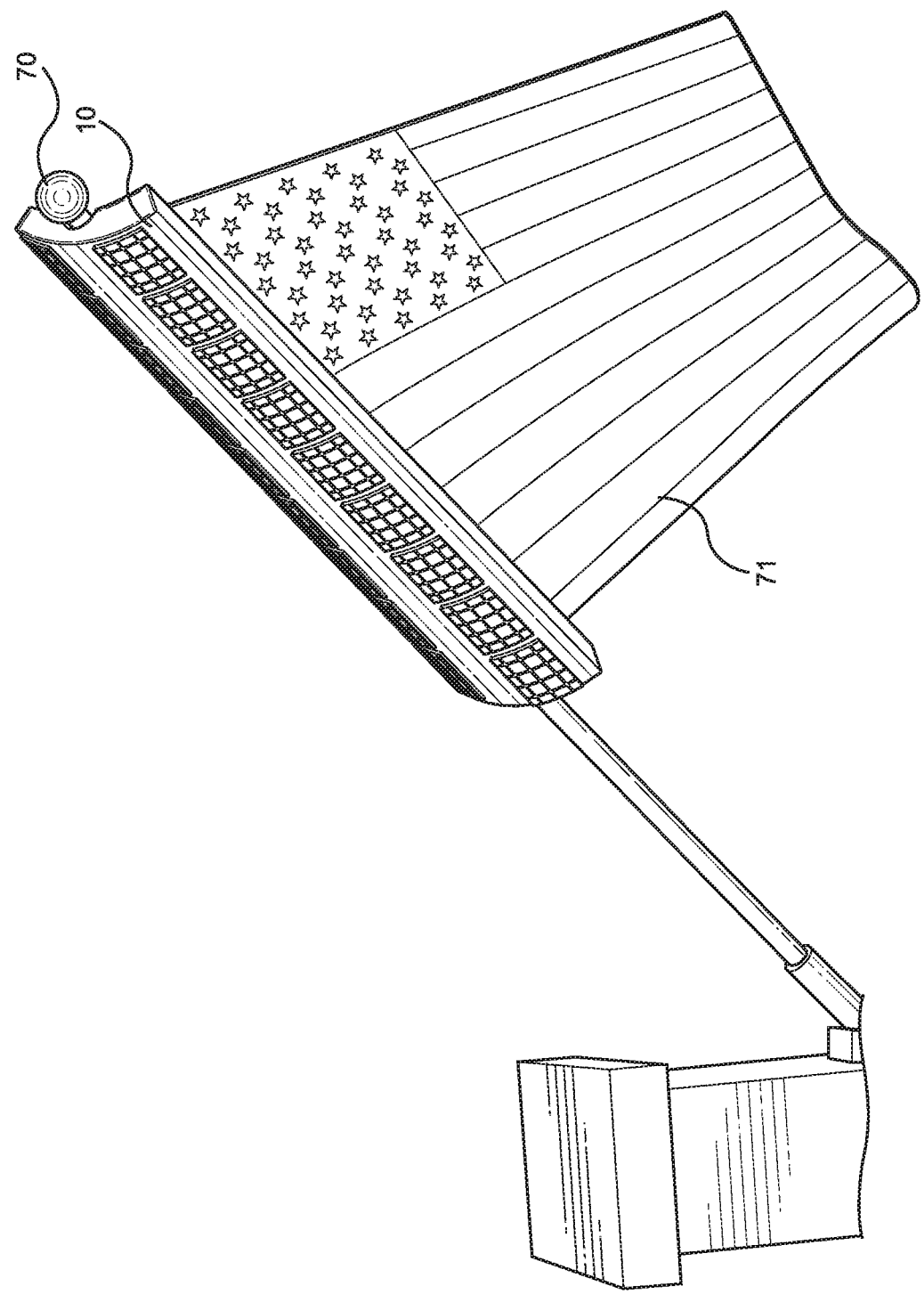
FIG. 5 shows a perspective view of an embodiment of the solar-powered flag light in use.

Referring now to FIG. 5, there is shown a perspective view of an embodiment of the solar-powered flag light in use. In the illustrated embodiment, the solar-powered flag light is secured to a house or structure mounted flag pole. In operation, a user will place the solar-powered flag light 10 atop a pole 70, such that the pole is flush within the channel and the solar cells are aligned to receive sunlight thereon. Thus, the solar cells provide power to the power source, such as the rechargeable batteries, within, which is configured to power the plurality of lights disposed along the interior surface of the elongated housing, thereby providing light to front and back of a flag 71 disposed along the flag pole 70. In one embodiment, the plurality of lights is operably connected to a personal electronic device, such that the user can select from a plurality of pre-programmed blinking patterns to be performed by the lights. Thereby, the user can select a pattern of lights in either colors, so as to represent a favorite sports teams, or a pattern in actuation, such the flashing of lights in a particular manner can draw attention to the flag 71. In this way, a user can efficiently provide light to illuminate their flag.

In some embodiments, the solar-powered flag light 10 comprises a light sensor. The light sensor is configured to detect light, specifically, light produced by the sun that indicates daytime. The light sensor is in operable connection with the circuit board. When an amount of detected light falls below a threshold level, the circuit board will actuate the plurality of lights. As such, the plurality of lights can be automatically actuated in the nighttime, while not being actuated in the daytime. The light sensor is of any suitable configuration for detecting light.

Figure 6:
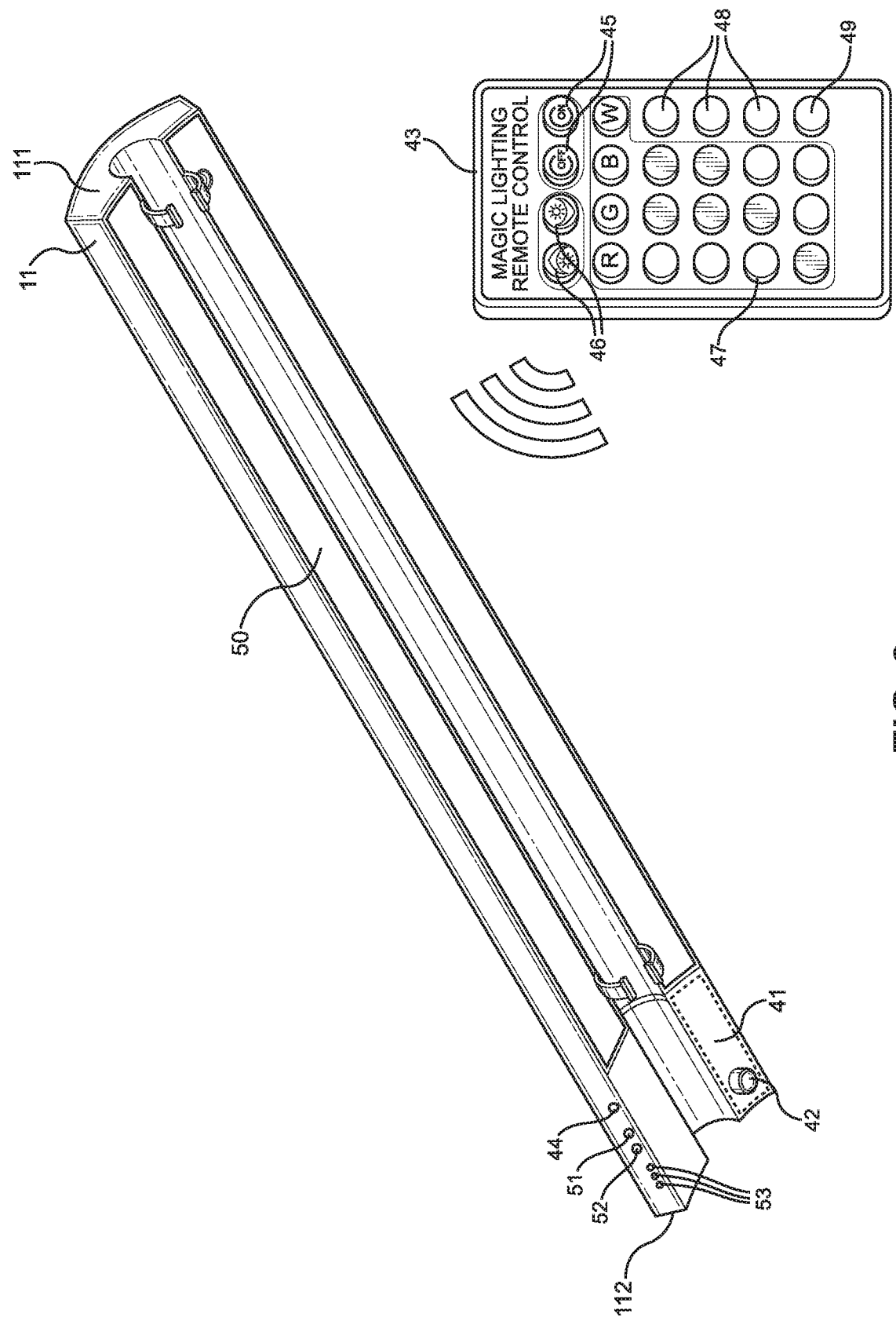
FIG. 6 shows a perspective view of an embodiment of the solar-powered flag light.

Referring now to FIG. 6, there is shown a perspective view of an embodiment of the solar-powered flag light. In the illustrated embodiment, the solar-powered flag light further comprises a wireless receiver and a wireless transceiver disposed in a compartment 41 in the elongated housing 11. As such, the solar-powered flag light is configured to act as a "hotspot" as the wireless receiver and the wireless transceiver act to connect a device to a network. In the illustrated embodiment, the compartment 41 is disposed on the second end 112 of the elongated housing 11, however, in alternate embodiments, the compartment 41 may be disposed at any location within the elongated housing 11. In the illustrated embodiment, a circuit board, such as a printed circuit board (PCB) is disposed in the elongated housing 11. The circuit board comprises, among other elements, a storage unit and a processor. In embodiments that comprise the wireless transceiver and the wireless receiver, the wireless transceiver and the wireless receiver are in operable connection with the circuit board.

Furthermore, in one embodiment, the solar-powered flag light further comprises a camera 42 disposed thereon. In the illustrated embodiment, the camera 42 is disposed in a clear dome, such that the camera 42 is protected. However, the camera 42 is of any suitable configuration for capturing images, recording video, streaming live video and may be utilized in conjunction with other recording, viewing devices or networks. In one embodiment, the camera 42 is in operable connection with a memory unit, such that images or video recording by the camera 42 can be stored. Additionally, in some embodiments, the camera 42 is adjustable, such that the camera 42 can be remotely positioned to face a desired direction. In the illustrated embodiment, the camera 42 is disposed on the second end 112 of the elongated housing 11, such as to increase the area that can be captured by the camera 42. By placing the camera 42 at this position, the camera 42 will be able to more effectively capture video and images of the area under the solar-powered flag light.

In the illustrated embodiment, the solar-powered flag light further comprises an infrared remote control 43. The infrared remote control 43 is in operable connection with the solar-powered flag light via an infrared sensor 44. In the illustrated embodiment, the infrared sensor 44 is disposed on the elongated housing 11 at a side or rear surface thereof, such that the infrared sensor 44 is accessible from surfaces below and alongside the solar-powered flag light. The infrared sensor 44 is in operable connection with the circuit board. In some embodiment, the infrared sensor protrudes from the elongated housing 11, such as to increase the receptive range of the infrared sensor 44.

The infrared remote control 43 comprises plurality of buttons 45, 46, 47, 48, 49 disposed on an external surface thereof. Each button of the plurality of buttons is configured to execute a command. In one embodiment, the plurality of buttons comprises a pair of power buttons 45. The power buttons 45 are configured to turn the solar-powered flag light on and off. In another embodiment, the plurality of buttons comprises a plurality of brightness control buttons 46. The brightness control buttons 46 are configured to control the brightness at which the plurality of lights shines. In a further embodiment, the plurality of buttons comprises a plurality of color control buttons 47. The plurality of color control buttons 47 are configured to control the color at which the plurality of lights shines. In yet another embodiment, the plurality of buttons comprises a plurality of pattern buttons 48. The plurality of pattern buttons 48 are configured to change the frequency or pattern in which the plurality of lights is actuated. The frequencies or patterns in which the plurality of lights is configured to display are stored on the storage unit of the circuit board. In one embodiment, the plurality of pattern buttons comprises a flash button, corresponding to selectable flashing patterns, a strobe button, corresponding to a selectable strobing patterns and a fade button, corresponding to a selectable fading pattern.

In one embodiment, the infrared remote control 43 comprises a modification button 49. The modification button 49 is configured to alter the function of colors displayed by the plurality of lights. In use, the user may press the modification button 49 then a color control button 47, causing the plurality of lights to display two corresponding colors simultaneously.

In the illustrated embodiment, the solar-powered flag light comprises a pair of light diffusers 50 disposed on opposing sides of the elongated housing 11. The pair of light diffusers 50 are opaque, such as to obscure the view of the plurality of lights and to dampen the harshness of the lights. In the illustrated embodiment, the pair of light diffusers 50 are defined entirely on the bottom side of the elongated housing 11. The pair of light diffusers 50 may be of any suitable configuration, shape or opacity.

Furthermore, in the illustrated embodiment, a power button 51 and a test/demo button 52 are provided. The power button 51 and the test/demo button 52 are in operable connection with the circuit board. The power button 51 is configured to turn the solar-powered flag light on and off when engaged by the user. The test/demo button 52 is configured to temporary actuate the solar-powered flag light in a pre-determined pattern stored upon the circuit board disposed in the elongated housing. In embodiments comprising a timer, the power button 51 and the test/demo button 52 can be used in conjunction with each other to set a timer for a pattern or frequency displayed by the plurality of lights. Specifically, in certain embodiments, the power button 51 and the test/demo button 52 may be pressed simultaneously to engage the timer. Once the timer is engaged, the user may adjust the length of the timer by pressing the test button 52.

In the illustrated embodiment, the elongated housing 11 comprises a plurality of status lights 53 disposed on a side portion thereof. The plurality of status lights 53 are configured to be actuated in response to a specific event. The plurality of status lights 53 may comprise a power status light, wherein the power status light is actuated when the solar-powered flag light is turned on. Additionally, the plurality of status lights 53 may comprise a charging status light, wherein the charging status light is actuated when the solar-powered flag light is being charged. Furthermore, the plurality of status lights 53 may comprise a battery capacity indicator light, wherein the battery capacity indicator light is configured to display a color corresponding to a battery level. For example, the battery capacity indicator light can display a green light when the power level is greater than 30%, an orange light when the power level is between 30% and 10%, and a red light when the power level is less than 10%.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar-powered flag light, comprising:
   an elongated housing having an exterior surface and an interior surface;
   the elongated housing having an arcuate shape such that the interior surface is concave;
   the interior surface defining a pair of flat surfaces on opposing sides of a channel;
   the channel disposed on the interior surface along a central axis configured to receive a pole therein;
   a plurality of lights disposed along the pair of flat surfaces of the interior surface;
   the plurality of lights in operable connection with a circuit board;
   a plurality of solar cells disposed along the exterior surface;
   at least one power source disposed within the housing operably connected to the plurality of lights and the plurality of solar cells;
   the at least one power source in operable connection with the circuit board;
   at least one speaker disposed within the elongated housing;
   the at least one speaker disposed at a first end of the elongated housing proximal to a mounted surface;
   wherein the at least one speaker comprises a pair of speakers, each speaker of the pair of speakers disposed on the first end of each flat surface of the pair of flat surfaces.

2. The solar-powered flag light of claim 1, wherein the power source is a rechargeable battery.

3. The solar-powered flag light of claim 1, wherein the power source is removable.

4. The solar-powered flag light of claim 1, further comprising a switch configured to actuate the plurality of lights.

5. The solar-powered flag light of claim 1, further comprising a switch configured to actuate the speaker.

6. The solar-powered flag light of claim 1, further comprising a logic disposed upon the circuit board, inside the elongated housing.

7. The solar-powered flag light of claim 6, further comprising a pairing button disposed along the elongated housing, wherein the pairing button is operably connected to the logic such that the pairing information is saved therein.

8. The solar-powered flag light of claim 1, wherein at least one clamp is disposed on the elongated housing.

9. The solar-powered flag light of claim 1, wherein at least one camera is disposed on the exterior surface of the elongated housing.

10. The solar-powered flag light of claim 9, wherein the camera is configured to record and create a video file.

11. The solar-powered flag light of claim 9, wherein the elongated housing defines a first end proximal to a mounted surface opposite a second end distal to the mounted surface, wherein the camera is disposed at the second end of the elongated housing.

12. The solar-powered flag light of claim 10, wherein the camera is configured to stream live video and sound.

13. The solar-powered flag light of claim 1, further comprising a wireless receiver and a wireless transceiver, configured to extend the range of a wireless network.

14. The solar-powered flag light of claim 1, further comprising an infrared remote control.

15. The solar-powered flag light of claim 14, wherein the infrared remote control is configured to change a color of the plurality of lights.

16. The solar-powered flag light of claim 14, wherein the infrared remote control is configured to change a pattern of the plurality of lights, wherein a plurality of pre-programmed patterns is stored upon the circuit board, such that the user may select a pre-programmed pattern using the infrared remote control.

17. The solar-powered flag light of claim 1, further comprises a pair of light diffusers operably disposed on the elongated housing over the plurality of lights.

18. The solar-powered flag light of claim 1, wherein a power source monitoring system is stored on the circuit board, the power source monitoring system configured to dim the lights once a power level of the power source falls beneath a threshold.

19. The solar-powered flag light of claim 1, further comprising a light sensor in operable connection with the circuit board, the light sensor configured to detect light and to actuate the plurality of lights when an amount of detected light falls below a threshold level.

* * * * *